(12) United States Patent
Taliercio et al.

(10) Patent No.: US 10,527,287 B2
(45) Date of Patent: Jan. 7, 2020

(54) INJECTORS FOR GAS TURBINE COMBUSTION CHAMBER

(71) Applicant: SAFRAN HELICOPTER ENGINES, Bordes (FR)

(72) Inventors: Guillaume Taliercio, Moissy-Cramayel (FR); Nicolas Savary, Moissy-Cramayel (FR); Olivier Lamaison, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 16/092,694

(22) PCT Filed: Apr. 6, 2017

(86) PCT No.: PCT/FR2017/050830
§ 371 (c)(1),
(2) Date: Oct. 10, 2018

(87) PCT Pub. No.: WO2017/178736
PCT Pub. Date: Oct. 19, 2017

(65) Prior Publication Data
US 2019/0170357 A1  Jun. 6, 2019

(30) Foreign Application Priority Data

Apr. 13, 2016 (FR) .................... 16 53260

(51) Int. Cl.
*F23R 3/34* (2006.01)
*F02C 7/228* (2006.01)
*F23R 3/56* (2006.01)

(52) U.S. Cl.
CPC ............... *F23R 3/34* (2013.01); *F02C 7/228* (2013.01); *F23R 3/56* (2013.01)

(58) Field of Classification Search
CPC ...... F23R 3/14; F23R 3/22; F23R 3/34; F23R 3/38; F23R 3/56
See application file for complete search history.

(56) References Cited

U.S. PATENT DOCUMENTS

| 4,761,959 A | 8/1988 | Romey et al. |
| 6,925,812 B2 * | 8/2005 | Condevaux ............... F02C 7/22 239/214.11 |

(Continued)

FOREIGN PATENT DOCUMENTS

FR          2 971 039 A1    8/2012

OTHER PUBLICATIONS

International Preliminary Report on Patentability and the Written Opinion of the International Searching Authority as issued in International Patent Application No. PCT/FR2017/050830, dated Oct. 16, 2018.

(Continued)

*Primary Examiner* — Arun Goyal
(74) *Attorney, Agent, or Firm* — Pillsbury Winthrop Shaw Pittman LLP

(57) ABSTRACT

An injector for a gas turbine combustion chamber, includes a fluid feed system; an injector body extending along a longitudinal axis; an injection head arranged on the injector body and configured to spray the fluid in a direction that is inclined relative to the longitudinal axis; and an actuator configured to turn the injector selectively about the longitudinal axis so as to vary the direction in which the fluid is sprayed; wherein the actuator is configured to enable the orientation of the injector to be varied by turning about the longitudinal axis through an amplitude less than or equal to 90°.

8 Claims, 1 Drawing Sheet

(56) References Cited

U.S. PATENT DOCUMENTS

| 8,707,703 B2* | 4/2014 | Kim ........................ F23C 7/006 60/39.23 |
| 2009/0236442 A1 | 9/2009 | Ijsselstein |
| 2012/0052451 A1* | 3/2012 | Bathina ..................... F23R 3/14 431/9 |
| 2015/0323185 A1* | 11/2015 | Silkowski ................. F23R 3/50 60/748 |
| 2017/0234543 A1* | 8/2017 | Plante ....................... F01D 1/12 60/39.35 |

OTHER PUBLICATIONS

International Search Report as issued in International Patent Application No. PCT/FR2017/050830, dated Aug. 1, 2017.

\* cited by examiner

INJECTORS FOR GAS TURBINE COMBUSTION CHAMBER

CROSS REFERENCE TO RELATED APPLICATIONS

This application is the U.S. National Stage of PCT/FR2017/050830 filed Apr. 6, 2017, which in turn claims priority to French Application No. 1653260, filed Apr. 13, 2016. The contents of both applications are incorporated herein by reference in their entirety.

GENERAL TECHNICAL FIELD

The present invention relates to the field of combustion chambers for aircraft, and more precisely to injectors for such combustion chambers.

STATE OF THE ART

The injectors used within aircraft combustion chambers are typically configured to present performance that is optimized as a function of various different operating speeds.

These different combustion speeds nevertheless have characteristics that are very different, sometimes involving conflicting constraints, which makes it necessary to find a performance compromise for the chamber between different conditions.

As a result, present injectors leave a considerable margin in terms of optimization.

SUMMARY OF THE INVENTION

The present invention thus seeks to propose a system that satisfies this problem, at least in part.

To this end, the present invention provides an injector for a gas turbine combustion chamber, the injector comprising:
  a fluid feed system;
  an injector body extending along a longitudinal axis; and
  an injection head arranged on the injector body and configured to spray said fluid in a direction that is inclined relative to the longitudinal axis; and
  said injector further comprises an actuator configured to turn the injector selectively about the longitudinal axis so as to vary the direction in which the fluid is sprayed, the actuator being configured to enable the orientation of the injector to be varied by turning about the longitudinal axis through an amplitude less than or equal to 90°.

The fluid feed system typically includes a flexible feed line or a rigid feed line having a leaktight hinge at the injector.

The invention also provides a combustion chamber including at least one injector as defined above.

By way of example, the combustion chamber is a gyratory technology combustion chamber, and wherein said at least one injector is arranged in a sleeve outside the combustion chamber.

Typically, the actuator comprises control system configured to vary the orientation of the injector as a function of a pressure bypassing the combustion chamber and/or a fuel pressure.

The invention also provides a turbine engine including a combustion chamber as defined above.

The invention also provides an aircraft including a turbine engine.

SUMMARY OF THE FIGURES

Other characteristics, objects, and advantages of the invention appear from the following description, which is clearly illustrative and non-limiting, and which should be read with reference to the accompanying drawings, in which.

Throughout the figures, elements that are in common are identified by identical numerical references.

DETAILED DESCRIPTION

Figure 1:
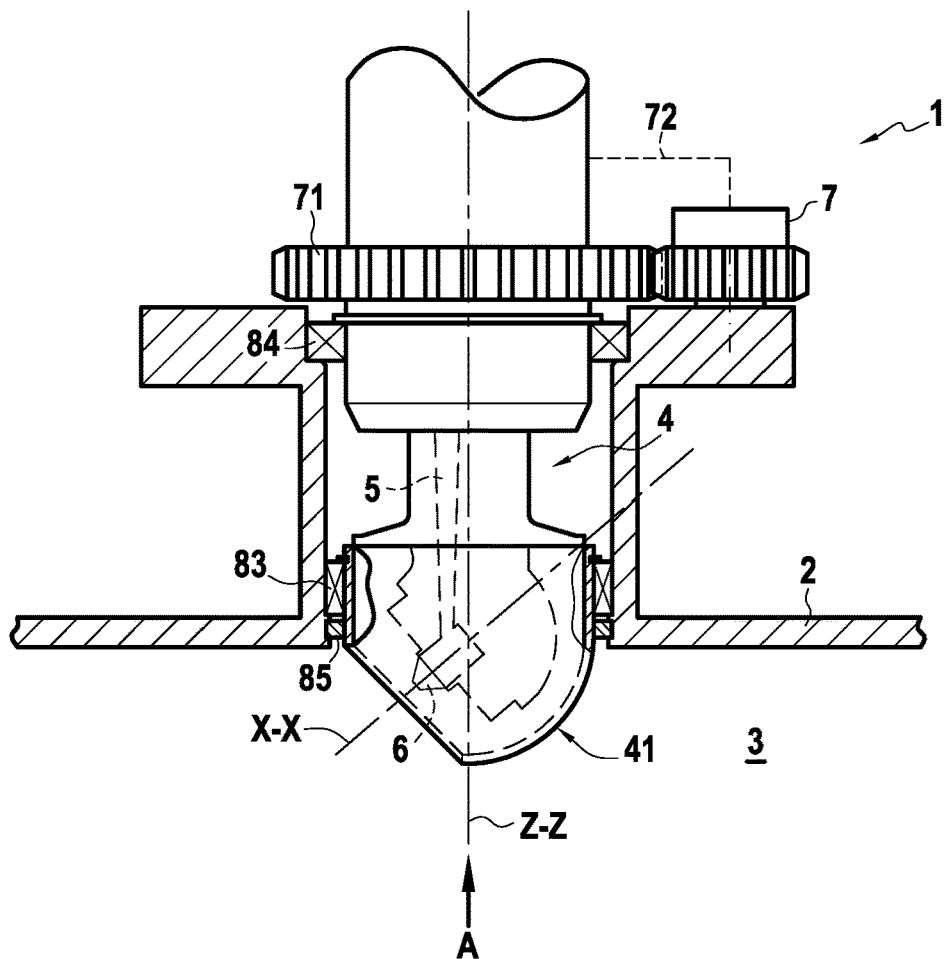
FIG. 1 is a diagram of an injector in a aspect of the invention.
Figure 2A:
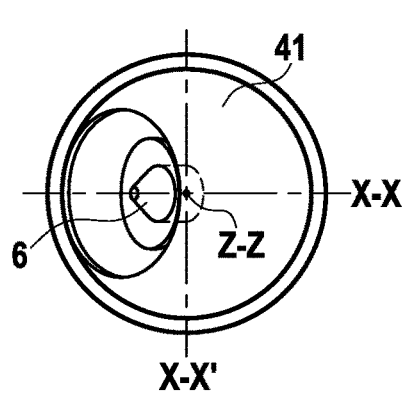
FIGS. 2A and 2B are diagrams showing its operation.
Figure 2B:
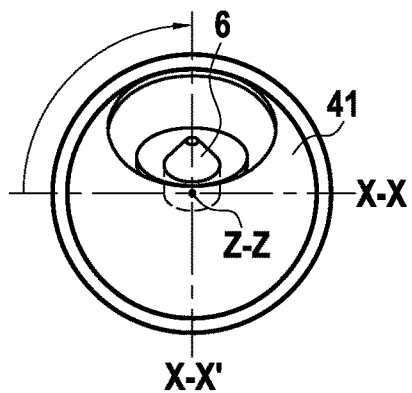

FIG. 1 is a diagram of an injector in an aspect of the invention, and FIGS. 2A and 2B are diagrams showing its operation.

FIG. 1 is a view of an injector 1 mounted in a wall 2 of a combustion chamber 3, typically a gyratory technology combustion chamber, e.g. suitable for being integrated in an aircraft turbine engine.

When the combustion chamber 3 is of gyratory technology, the injector 1 is then arranged by way of example in a sleeve outside the combustion chamber 3.

As shown, the injector 1 comprises a body 4 having an end 41 projecting into the inside volume of the combustion chamber 3. The body 4 of the injector 1 extends in a longitudinal direction, defining a longitudinal axis Z-Z.

A fluid feed system 5 is integrated in the body 4 of the injector 1 so as to feed an injection head 6 arranged in the end 41 of the body 4. The injection head 6 is typically formed by an injection nozzle.

In the example shown, the fluid feed system 5 is a duct extending substantially along the longitudinal axis Z-Z inside the body 4.

The fluid feed system 5 may include a feed line, e.g. presenting a flexible portion, or a rigid feed line having a leaktight hinge at the injector.

As shown, the end 41 is generally hemispherical in shape, with a portion that is hollow for receiving the injection head 6. The injection head 6 thus defines an injection direction identified by an injection axis X-X in the figures. This injection axis X-X is inclined relative to the longitudinal axis Z-Z at an angle in the range 0 to 90°.

In operation of the combustion chamber 3, the injector 1 is thus used to inject fuel along an injection direction defined by the orientation of the injection head 6.

In order to enable injection to be optimized regardless of the mode of operation of the combustion chamber 3, the system proposed also has an actuator 7 connected to the body 4 of the injector 1 via rotary drive means 71, specifically a cog wheel.

By way of example, the actuator 7 has drive means using a rack, a rod, or any other appropriate drive means.

The body 4 of the injector 1 is connected to the walls 2 of the combustion chamber 3 via bearings 83 and 84 that are configured to allow a degree of freedom to turn about the longitudinal axis Z-Z.

In the example shown, a first bearing 83 is arranged close to the end 41 of the body 4, and a second bearing 84 is set back, being arranged on a portion of the body 4 that is further away from the combustion chamber 3.

An insulating element 85 is typically arranged between the body 4 of the injector 1 and the wall 2 of the combustion chamber 3 so as to insulate and protect the first bearing 83 from the combustion chamber 3.

The actuator 7 thus enables the injector 1 to be pivoted about the longitudinal axis Z-Z. The amplitude of such pivoting is typically limited; for example through a maximum angle of 180°, or indeed a maximum angle of 90°.

FIGS. 2A and 2B are two views looking along the direction A identified in FIG. 1. These two FIGS. 2A and 2B show very diagrammatically an example of varying the orientation of the injector 1, with the injection direction going from the axis X-X to the direction X-X' that is at an angle of 90° relative to the axis X-X.

Such a variation in the orientation of the injector 1, and thus in the direction along which fluid is injected by the injection head 6 makes it possible to optimize the injection as a function of the operating speed of the combustion chamber 3.

Specifically, conventional injectors for a combustion chamber are stationary, which means that injection cannot be adapted to the operating mode of the combustion chamber, which leads to increased consumption of fuel during certain modes of operation, e.g. at low speeds.

The proposed structure thus makes it possible to optimize the operation of the combustion chamber 3, regardless of its mode of operation, and thus makes it possible to improve the robustness of the combustion system, while improving consumption under partial load.

Turning through an amplitude of about 90° typically suffices to enable the operation of the combustion chamber to be optimized in its various modes of operation.

For example, in a combustion chamber 3 having a plurality of injectors, each of the injectors may then be controlled independently in order to optimize the operation of the combustion chamber 3.

The injectors may be steered in active manner, e.g. by associating its calculation means with an actuator, or passively under control from the pressure of air in the combustion chamber 3, and/or the pressure that exists in the fluid feed system 5.

By way of example for passive type control, the pressure within the combustion chamber 3 and/or within the fluid feed system 5 may be taken off so as to control a system such as a jack or a piston driving the turning control means 71, thereby steering the injector 1.

A control pressure can thus be taken from within the combustion chamber 3 and/or within the fluid feed system 5, and oppose a thrust force that may be exerted by way of example by return means such as a spring defining a default orientation for the actuator 7. A change in the pressure within the combustion chamber 3 and/or within the fluid feed system 5 thus leads to varying the orientation of the injector 1, thereby enabling injection to be optimized. Associating the actuator or piston with means for taking off pressure, thereby constitutes an actuator 7 of passive type, thus enabling the orientation of the injector 1 to be controlled continuously.

As an example of providing active type control, the actuator 7 could be configured so as to steer the injector in question as a function of a pressure taken from within the combustion chamber 3 in an air circuit bypassing the combustion chamber, or indeed as a function of the pressure in the fluid feed system 5. More generally, the actuator 7 typically steers the injector under consideration as a function of the load on the engine that includes the combustion chamber. In the example of FIG. 1, a sensor 72 is shown diagrammatically that is configured to measure the pressure of fluid in the fluid feed system 5, the actuator 7 thus being able to steer the injector 1 as a function of this measurement.

The actuator 7 is typically configured so as to steer the injector 1 continuously, thus making it possible in particular to avoid transient phenomena appearing, which might damage the combustion chamber.

The invention claimed is:

1. An injector for a gas turbine combustion chamber, the injector comprising:
   a fluid feed system in fluid communication with an injection head;
   an injector body extending along a longitudinal axis;
   the injection head arranged at an end of the injector body and configured to spray said fluid in a direction that is inclined relative to the longitudinal axis; and
   an actuator configured to rotate the injector selectively about the longitudinal axis so as to vary the direction in which the fluid is sprayed;
   wherein the actuator is configured to enable orientation of the injector to be varied by rotating about the longitudinal axis through an amplitude less than or equal to 90°.

2. The injector according to claim 1, wherein said fluid feed system includes a flexible feed line or a rigid feed line having a leaktight hinge connecting it to the injector.

3. A combustion chamber including the injector according to claim 1.

4. The combustion chamber according to claim 3, wherein said combustion chamber is a gyratory technology combustion chamber, and wherein said injector is arranged in a sleeve outside the combustion chamber.

5. The combustion chamber according to claim 3, wherein said actuator comprises a control system configured to vary the orientation of the injector as a function of a pressure bypassing the combustion chamber and/or a fuel pressure.

6. A turbine engine including the combustion chamber according to claim 3.

7. An aircraft including the turbine engine according to claim 6.

8. A combustion chamber including the injector according to claim 2.

* * * * *